United States Patent [19]

Sudo

[11] Patent Number: 5,487,094

[45] Date of Patent: Jan. 23, 1996

[54] DOUBLE-LAYER PELLET, METHOD OF MANUFACTURING THE SAME, AND APPARATUS FOR MANUFACTURING THE SAME

[75] Inventor: Shigeru Sudo, Nagoya, Japan

[73] Assignee: The Director-General of the National Institute for Fusion Science, Nagoya, Japan

[21] Appl. No.: 298,309

[22] Filed: Sep. 1, 1994

[30] Foreign Application Priority Data

Sep. 30, 1993 [JP] Japan .................................. 5-244214

[51] Int. Cl.⁶ ................................................... G21B 1/00
[52] U.S. Cl. ........................... 376/100; 376/151; 376/101; 376/916; 427/5; 427/212; 427/289
[58] Field of Search ..................................... 376/100, 101, 376/151, 152, 916; 427/5, 6, 212, 289

[56] References Cited

FOREIGN PATENT DOCUMENTS

| | | |
|---|---|---|
| 62-38387 | 2/1987 | Japan . |
| 4-240102 | 8/1992 | Japan . |
| 4-335187 | 11/1992 | Japan . |

OTHER PUBLICATIONS

Fusion, vol. 1, Magnetic Confinement Part B, (1981), Academic Press, N.Y., Edited by Edward Teller, p. 457.

Primary Examiner—Harvey E. Behrend
Attorney, Agent, or Firm—Oblon, Spivak, McClelland, Maier & Neustadt

[57] ABSTRACT

A pellet carrier disc is movably held between two cooling blocks. The disc is vertically moved, setting its through hole into axial alignment with a first hole of the block. Deuterium gas is supplied into the through hole through the hole, and cooled and solidified, forming a deuterium cylinder. Then, the disc is moved, axially aligning the hole with a second hole of the block. A shaft is thrust into a first end of the deuterium cylinder through the hole, thereby forming a hole in the end of the cylinder. Next, the disc is moved, axially aligning the hole with a third hole of the block. Tritium gas is introduced into the hole of the cylinder through the hole, and cooled and solidified, forming a tritium core. Further, the disc is moved, axially aligning the hole with a fourth hole of the block. A shaft is moved through the hole, causing the second end portion of the deuterium cylinder to project from the hole. The second end portion of the cylinder is cut off. An additional amount of deuterium gas is applied on to the first end of the cylinder, and cooled and solidified, forming a layer covering the tritium core.

6 Claims, 10 Drawing Sheets

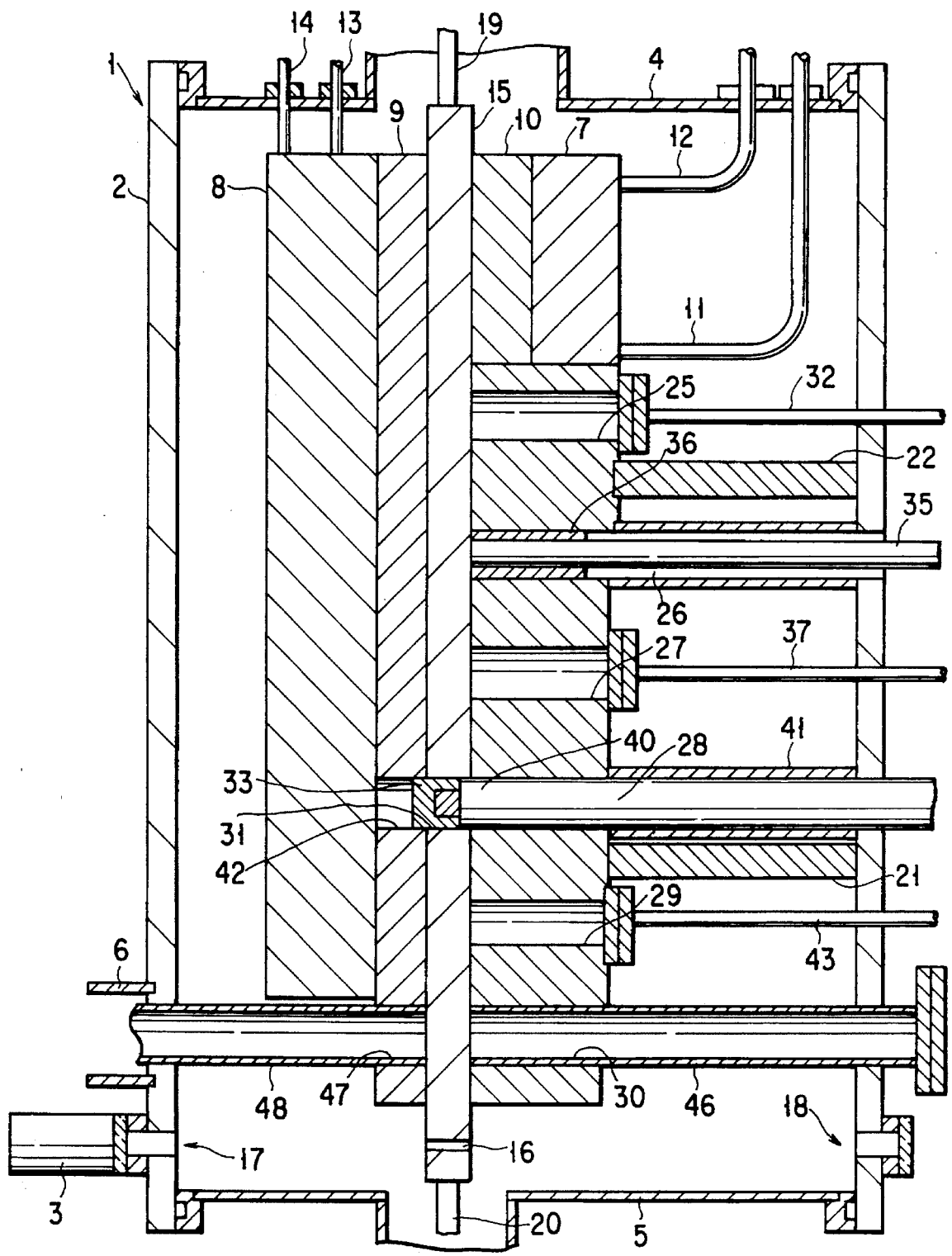
F I G. 1

DOUBLE-LAYER PELLET, METHOD OF MANUFACTURING THE SAME, AND APPARATUS FOR MANUFACTURING THE SAME

BACKGROUND OF THE INVENTION

1. Field of the Invention

The present invention relates to a double-layer pellet which is to be placed in the high-temperature plasma generated in a fusion reactor or an experimental fusion apparatus, in order to refuel the reactor or the apparatus, to analyze particle transport, to improve plasma heating and to serve a similar purpose. The invention also relates to an apparatus and method for manufacturing the double-layer pellet.

2. Description of the Related Art

Fossil fuel, which is the main energy source we use today, will be exhausted in the future. Energy-acquiring technology utilizing nuclear fusion is being developed in various regions over the world, such as EC, Japan, the U.S. and Russia. The progress in this development is accompanied by two things. The first is an increase in the size of the experimental apparatuses employed. The second is an increase in the size of the plasma generated therein. Of the fusion reactors hitherto known, a D-T type fusion reactor fueled with deuterium and tritium is most promising in view of its reaction efficiency.

Generally known as a method of refueling the D-T type fusion reactor is gas puff method, in which deuterium gas and tritium gas are injected into plasma.

The gas puff method is, however, disadvantageous in some respects. First, the fuel particles can hardly reach the core of the plasma, particularly when the plasma is large. Second, it is quite probable that the fuel particles are repelled back by the peripheral part of the plasma, known as "divertor layer," before they are injected into the plasma.

To render the gas puff method more efficient, experiments have been conducted in which single-layer pellets made by solidifying tritium gas or a mixture of deuterium gas and tritium gas are injected into plasma.

Such single-layer pellets are manufactured by an apparatus generally known in the art in such a manner that liquid helium is supplied to the cryo portion cooling metal pipes or a metal plate having holes to an extremely low temperature; hydrogen isotope gas is supplied into the metal pipes or the holes of the cooled metal plate, and then the gas is solided in the pipes or the holes, thus forming single-layer pellets. New technique of manufacturing single-layer pellets has recently been developed, as is disclosed in Jpn. Pat. Appln. KOKAI Publication No. 4-240102. This technique consists in forming a core of another hydrogen isotope within a single-layer pellet, thereby rendering the isotope-mixing ratio in the outer layer different from the isotope-mixing ratio in the core.

The apparatus produces pellets in which solid tritium is present in the surface. When the pellets are placed in the plasma generated in a fusion reactor or the like, tritium is not only supplied into the central part of the plasma which is at high temperatures and high density and in which nuclear fusion may take place with high efficiency, but also supplied, undesirably, into the peripheral part of the plasma which is at relatively low temperatures.

Tritium is a radioactive substance; it must be wasted as little as possible to minimize the load on the exhaust pump system, tritium-recollecting system and tritium-separating system of the fusion reactor. The tritium supplied to the divertor layer of the plasma is partly repelled from the plasma, and is not used at all in the nuclear fusion. Part of the tritium is adsorbed by the wall of the vacuum vessel of the reactor. The remaining part of the tritium is evacuated from the vacuum vessel by the vacuum pump system. This inevitably results in an increase in the load on the tritium-processing system.

To solve these problems which are inherent in the use of single-layer pellets, there have been invented double-layer pellets. A double-layer pellet is made up of a core of solid tritium and an outer layer of solid deuterium, which completely covers the tritium core. An apparatus for manufacturing double-layer pellets is known, as is disclosed in Jpn. Pat. Appln. KOKAI Publication No. 4-335187.

This apparatus has metal pipes in which gases solidify to form double-layer pellets. In this apparatus, each double-layer pellet is made in three steps. First, deuterium-gas is supplied into each metal pipe, forming a hollow cylinder or layer of solid deuterium on the cooled inner surface of the metal pipe. Then, tritium gas is supplied into the deuterium cylinder, forming an elongated tritium core. Finally, deuterium gas is applied into the pipe from both ends thereof, forming two deuterium layers which cover the ends of the elongated tritium core. As a result, a double-layer pellet is obtained which consists of a tritium core and a deuterium layer completely covering the core.

To design an efficient fusion reactor it is necessary to know physical property of transport of particles and heat. This is because the size of the reactor greatly depends on the physical property of transport of particles and heat. Thus, the transport of particles and heat influences the cost of building a fusion reactor. This is very important from an industrial point of view.

Despite the efforts made over years in the past, the transport of particles and heat in high-temperature plasma cannot be said to be well understood. An active particle transport diagnosis is known, which serves to analyze the transport of particles and heat.

Known as two typical examples of active particle transport diagnosis are: laser blow-off method and impurity-pellet injection method.

In the laser blow-off method, a substrate of glass or the like, having a silicon or aluminum or the other atom film bonded to it, is placed in a plasma-confining vacuum vessel, and a laser beam is irradiated on the silicon or aluminum film, thereby evaporating the silicon or aluminum and leading the resultant vapor into the plasma, and the behavior of particles is observed. In the impurity-pellet injection method, an apparatus is used to inject impurity pellets into the plasma present in a plasma-confining vacuum vessel. The apparatus has pipes or a metal plate having holes or pipes. Pellets made of a solid material such as lithium are set in the pipes or the holes of the metal plate and injected into the plasma, propelled by high-pressure gas or the like.

The experimental fusion apparatus is equipped with no mechanism which can reliably determine the sizes of the outer layer and the core or the positional relation thereof.

The active particle transport diagnosis, described above, cannot serve to analyze the physical aspects of transport of particles and heat in a fusion reactor. More specifically, the diagnosis cannot provide a reliable quantitative analysis of spatial changes in particle transport. This is because the absolute number of particles supplied is unknown, particularly in terms of space, and the particles are deposited in all locations from the peripheral part of the plasma into the central part of the plasma.

There is another problem with a fusion reactor or an experimental fusion apparatus. The high-temperature plasma generated in the fusion reactor or apparatus contains tail ions produced by the ion cyclotron range of frequency (ICRF) heating method. If heated high-energy ions are present also in that region of the plasma in which energy loss is prominent, the heating efficiency inevitably decreases.

To solve the problems mentioned above and to analyze the physical aspects of transport of particles and heat into a fusion reactor, there is a demand for double-layer pellets which have the similar structure as refueling pellets, each of which comprises a core and an outer layer whose sizes and positional relation can be reliably determined, and which can serve to inject particles, in no excess numbers, to a desired part of plasma. For example, double-layer pellets whose cores are tiny chips of, for example, lithium are particularly preferable.

Double-layer pellets of this type cannot be manufactured by the conventional apparatus described above, however, due to the structure of the apparatus. To manufacture such double-layer pellets, chips used as cores may be made to float in air, and deuterium solidifies, forming outer layers on the chips. It is utmost difficult to manufacture the pellets by this method.

SUMMARY OF THE INVENTION

Accordingly it is an object of the present invention to provide a method and apparatus which can easily manufacture double-layer pellets whose cores and outer layers can be controlled in their size and their positional relationship, whose cores can be formed without fail, and which can therefore serve to supply fuel into a desired part of plasma in no excess amount.

Another object of the invention is to provide a method and apparatus which can easily manufacture double-layer pellets whose cores are made of chips and whose cores and outer layers can be controlled in their sizes and their positional relationship, which serve to analyze transport of particles and heat in a fusion reactor and, hence, to inject particles to be observed, in no excess numbers, into a desired part of plasma.

According to a first aspect of the present invention, there is provided a method of manufacturing a double-layer pellet, which comprises the steps of: supplying a first material for forming an outer layer, into a space provided in a pellet carrier body; cooling and solidifying the first material in the space, thereby forming a cylinder of the first material; forming a hole in a first end of the cylinder; supplying a second material for forming a core, into the hole formed in the first end of the cylinder; cooling and solidifying the second material in the hole, thereby forming a core; scraping a second end of the cylinder, which is opposite to the first end; and supplying an additional amount of the first material onto the first end of the cylinder, cooling and solidifying the additional amount of the first material, thereby forming a layer covering the core of the second material.

According to a second aspect of the invention, there is provided an apparatus for manufacturing a double-layer pellet. The apparatus comprises: a pellet carrier body having a through hole and movable in one direction; cooling means for cooling at least a portion of the pellet carrier body, in which the through hole is formed; first material-supplying means reaching the pellet carrier body, for supplying a first material for forming an outer layer, into the through hole of the pellet carrier body, thereby cooling and solidifying the first material in the through hole and forming a cylinder of the first material; hole-forming means opposing the pellet carrier body and located downstream of the first material-supplying means, for forming a hole in a first end of the cylinder of the first material set in the through hole of the pellet carrier body; second material-supplying means opposing the pellet carrier body and located downstream of the first material-supplying means, for supplying a second material for forming a core, into the hole formed in the first end of the cylinder, thereby forming a core; pushing means opposing the pellet carrier body and located downstream of the chip-inserting means, for pushing the cylinder such that the second end portion of the cylinder projects from the through hole of the pellet carrier body; material-removing means opposing the pellet carrier body and located downstream of the second material-supplying means, for removing a second end portion of the cylinder; and a third material-supplying means opposing the pellet carrier body and located downstream of the material-removing means, for supplying an additional amount of the first material onto the first end of the cylinder, thereby forming a layer covering the core of the second material.

According to a third aspect of this invention, there is provided a method of manufacturing a double-layer pellet, comprising: a first step of supplying a first material for forming an outer layer, into a space provided in a pellet carrier body; a second step of cooling and solidifying the first material in the space, thereby forming a cylinder of the first material; a third step of inserting a chip into a first end of the cylinder; a fourth step of scraping a second end of the cylinder, which is opposite to the first end; and a fifth step of supplying an additional amount of the first material onto the first end of the cylinder, cooling and solidifying the additional amount of the first material, thereby forming a layer covering the chip.

According to a fourth aspect of the present invention, there is provided an apparatus for manufacturing a double-layer pellet. The apparatus comprises: a pellet carrier body having a through hole and movable; cooling means for cooling at least a portion of the pellet carrier body, in which the through hole is formed; first material-supplying means opposing the pellet carrier body, for supplying a first material for forming an outer layer, into the through hole of the pellet carrier body, thereby cooling and solidifying the first material in the through hole and forming a cylinder of the first material; chip-inserting means opposing the pellet carrier body and located downstream of the first material-supplying means, for inserting a chip into a first end of the cylinder formed in the through hole of the pellet carrier body; material-removing means opposing the pellet carrier body and located downstream of the chip-inserting means, for removing a second end portion of the cylinder; and second material-supplying means opposing the pellet carrier body and located downstream of the material-removing means, for supplying an additional amount of the first material onto the first end of the cylinder, thereby forming a layer covering the core of the second material.

According to a fifth aspect of this invention, there is provided a double-layer pellet comprising: a core of a liquid or a solid material; and an outer layer made of a solid material and covering the entire core.

In the apparatus according to the second aspect of the invention, the cooling means cools the pellet carrier body. Then, the pellet carrier body is moved until its hole comes to oppose the first material-supplying means. The first material-supplying means supplies a first material into the through hole of the carrier body. The first material is cooled and solidified, forming a cylinder in the through hole of the carrier body. Thereafter, the pellet carrier body is moved until its hole comes to oppose the hole-forming means. The hole-forming means forms a hole in a first end of the cylinder of the first material. Next, the carrier body is moved until its hole comes to oppose just the second material-supplying means. The second material-supplying means supplies a second material into the hole formed in the first end of the cylinder, thereby forming a core. The carrier body is then moved until its hole comes to oppose the the pushing means. The pushing means pushes the cylinder such that the second end portion of the cylinder projects from the through hole of the pellet carrier body for a prescribed distance. Next, the carrier body is moved until its hole comes to oppose the third material-supplying means. As the carrier body is so moved, the material-removing means removes a second end portion of the cylinder from the through hole of the pellet carrier body. Then, the third material-supplying means supplies an additional amount of the first material onto the first end of the cylinder, thereby forming a layer covering the core of the second material.

In the apparatus according to the fourth aspect of the invention, the cooling means cools the pellet carrier body. Then, the pellet carrier body is moved until its hole comes to oppose the first material-supplying means. The first material-supplying means supplies a first material into the through hole of the carrier body. The first material is cooled and solidified, forming a cylinder in the through hole of the carrier body. Thereafter, the pellet carrier body is moved until its hole comes to oppose the chip-inserting means. The chip-inserting means inserts a chip into a first end of the cylinder of the first material. The carrier body is then moved until its hole comes to oppose the the pushing means. The pushing means pushes the cylinder such that the second end portion of the cylinder projects from the through hole of the pellet carrier body for a prescribed distance. Next, the carrier body is moved until its hole comes to oppose the second material-supplying means. As the carrier body is so moved, the material-removing means removes a second end portion of the cylinder from the through hole of the pellet carrier body. Then, the second material-supplying means supplies an additional amount of the first material onto the first end of the cylinder, thereby forming a layer covering the core of the second material.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a sectional view showing an apparatus for manufacturing double-layer pellets, which is a first embodiment of the present invention;

DETAILED DESCRIPTION OF THE PREFERRED EMBODIMENTS

Figure 2A:
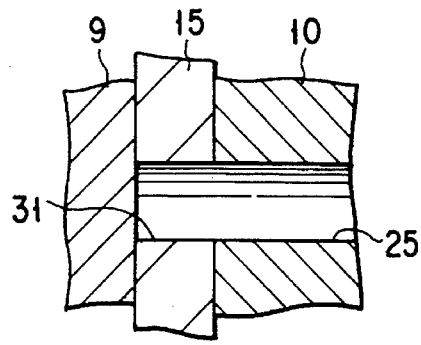
FIGS. 2A and 2B are enlarged sectional views showing a section of the apparatus, for explaining how deuterium solidifies, forming a cylinder.

A first embodiment of the present invention will be described with reference to the accompanying drawings, which is an apparatus for manufacturing double-layer pellets whose cores are made of tritium.

FIG. 1 is a sectional view of the entire apparatus. As shown in FIG. 1, the apparatus has a casing 1. The casing 1 comprises a main casing 2 consisting of four side walls, a top wall 4 closing the upper end of the main casing 2, a bottom wall 5 closing the lower end of the main casing 2, and a tubular casing 6 horizontally projecting from one side of the main casing 2. The tubular casing 6 covers a part of a pellet-ejecting barrel 48, which will be described later. The casing 1 is evacuated to a high vacuum by means of a vacuum pump (not shown).

Provided within the casing 1 are heat exchangers 7 and 8 and rectangular cooling blocks 9 and 10. The cooling blocks 9 and 10 are made of oxygen-free copper; they oppose each other and are spaced apart from each other by a predetermined distance. The heat exchangers 7 and 8 are connected to the cooling blocks 9 and 10, respectively, for cooling the blocks 9 and 10.

A helium liquid (or low temperature helium gas) inlet pipe 11 and a helium gas outlet pipe 12 are connected to the heat exchanger 7, respectively for supplying liquid helium (or low temperature helium gas) into the heat exchanger 7 and guiding helium gas therefrom. Similarly, a helium liquid (or low temperature helium gas) inlet pipe 13 and a helium gas outlet pipe 14 are connected to the heat exchanger 8, respectively for supplying liquid helium (or low temperature helium gas) into the heat exchanger 8 and guiding helium gas therefrom. The heat exchangers 8 and 9, the inlet pipes 11 and 13 and the outlet pipes 12 and 14 constitute means for cooling a pellet carrier disc 15, which will be described later.

In operation, liquid helium (or low temperature helium gas) flows into the heat exchangers 7 and 8 through the inlet pipes 11 and 13. It circulates in the heat exchangers 7 and 8. While circulating in the heat exchangers 7 and 8, the liquid helium evaporates (or the low temperature helium gas warms up), cooling the heat exchangers 7 and 8. The helium gas flows from the heat exchangers 7 and 8 through the outlet pipes 12 and 14.

The pellet carrier disc 15, used as a pellet carrier, is closely sandwiched between the cooling blocks 9 and 10 such that the disc 15 can be moved up and down. The disc 15 has a through hole 16 which serves to indicate the position of the disc 15. To be more specific, a laser 3 located outside the casing 1 emits a beam. The beam is applied through a vacuum window 17 made in the main casing 2, passes through the hole 16 of the disc 15, and emerges through a vacuum window 18 made in the main casing 2. Hence, the position of the pellet carrier disk 15 can be determined from the brightness of the beam as seen at the vacuum window 18.

Drive shafts 19 and 20 are connected, at one end, to the pellet carrier disk 15, for moving the disc 15 up and down with respect to the cooling blocks 9 and 10. The drive shafts 19 and 20 are connected, at the other end, to a drive mechanism (not shown). A position detector (not shown) is mounted on each drive shaft, for detecting the position of the pellet carrier disc 15.

The position of the disc 15 can be determined with high accuracy by the position detectors on the drive shafts 19 and 20 and the observation of the laser beam at the vacuum window 18. Elongation of the disc 15, if any, can therefore be reliably detected.

The heat exchangers 7 and 8, the cooling blocks 9 and 10, and the like are stationarily supported by support plates 21 and 22 which are secured to the main casing 3.

The cooling block 10 has circular through holes 25 to 30 which extend horizontally and parallel to one another. The holes 25, 26, 27, 28, 28 and 30 are arranged in the order mentioned from top to bottom, with their axes present in the same vertical plane.

The pellet carrier disk 15 has a circular through hole 31 which horizontally extends and has substantially the same diameter as the holes 25 to 30 of the cooling block 10. The hole 31 can be set into axial alignment with any one of the holes 25 to 30 of the cooling block 10 as the disk 15 is moved up and down by the drive shafts 19 and 20. More specifically, when the disc 15 takes the position shown in FIG. 1, the hole 31 axially aligns with the fourth hole 28 of the cooling block 10. To make the hole 31 align with the fifth hole 29 located below the fourth hole 28, the pellet carrier disk 15 is moved downwards by the drive shafts 19 and 20.

Figure 2B:
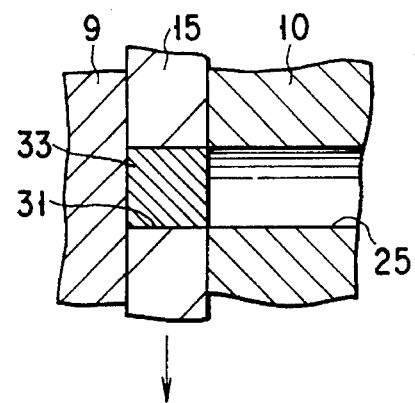

The first hole 25 of the cooling block 10 communicates with a pipe 32 which is used as first material-supplying means, so that deuterium gas supplied through the pipe 32 may solidify in the first hole 25. In operation, deuterium gas is introduced into the first hole 25 through the pipe 32 while the hole 31 of the disc 15 remains aligned with the first hole 25 as shown in FIG. 2A. The deuterium gas then solidifies, forming a deuterium block or cylinder 33, as shown in FIG. 2B, in the hole 31 of the disc 15 which has been cooled.

A bushing 36 is fitted in the second hole 26 of the cooling block 10. Movably inserted in the bushing 36 is a shaft 35 used as hole-making means for making a hole in the deuterium cylinder 33. The shaft 35 has a distal end portion, which has a circular cross section and a diameter far smaller than that of the second hole 26.

Figure 3A:
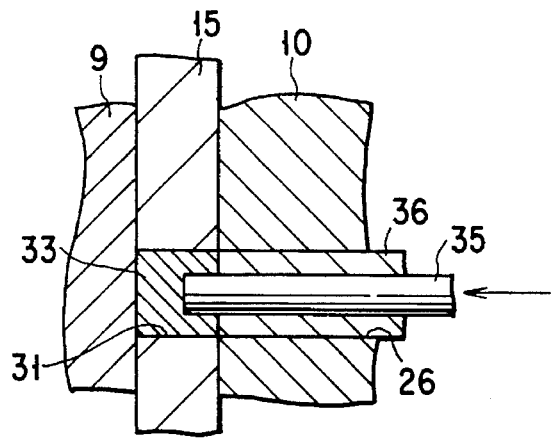
FIGS. 3A and 3B are enlarged sectional views showing said section of the apparatus, for explaining how a hole is made in the deuterium cylinder.

In operation, the shaft 35 is moved in the direction of the arrow shown in FIG. 3A, while the hole 31 of the disk 15 remains aligned with the second hole 26. The shaft 35 is moved until its distal end portion thrusts into the deuterium cylinder 33 for a prescribed distance from one end of the cylinder 33. The prescribed distance depends on the length of a core to be formed in the deuterium cylinder 33. It is, for example, about half the thickness of the pellet carrier disc 15. Thereafter, the shaft 35 is pulled from the deuterium block 33, in the direction of the solid-line arrow shown in FIG. 3B. As a result, a hole 34 is made in the deuterium block 33. It is in this hole 34 that a tritium cylinder will be formed as will be described later.

Inserted in the third hole 27 of the cooling block 10 is a pipe 37 which is used as second material supplying means for supplying tritium gas into the hole 34 made in the deuterium block 33. In operation, tritium gas, used as core material, is introduced into the hole 33 of the deuterium block 33, while the hole 31 of the disk 15 remains aligned with the third hole 26. In the hole 34 of the mass 33, the tritium gas solidifies, forming a tritium cylinder 40 which has the same dimensions as the hole 34. From a viewpoint of cryo technology it is easy to cool tritium gas in the hole 34 of the deuterium mass 33. This is because the solidifying highest temperature of tritium is higher than that of deuterium.

Movably inserted in the fourth hole 28 of the cooling block 10 is a shaft 41 which is used as pushing means and which can slide horizontally. At least the distal end portion of this shaft 41 has a diameter which is substantially the same as that of the deuterium cylinder 33. As shown in FIG. 1, the cooling block 9 has a hole or cylindrical space 42 which is used as shearing means. The hole 42 is axial aligned with the fourth hole 28 of the cooling block 10. The holes 28 and 42 have substantially the same diameter. They communicate with the hole 31 of the disc 15 as long as the pellet carrier disk 15 takes the position shown in FIG. 1.

Figure 5A:
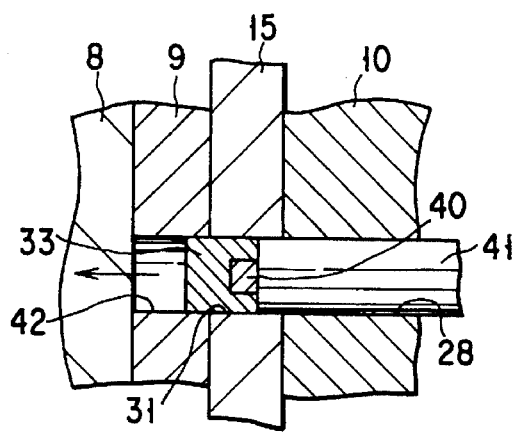
FIGS. 5A and 5B are enlarged sectional views of said section of the apparatus, for explaining how a tritium core is placed in the deuterium cylinder, and respectively showing the tritium core before moved into the deuterium cylinder and the tritium core completely set in the deuterium cylinder.

In operation, the disc 15 is moved until the hole 31 goes into axial alignment with both the fourth hole 28 of the block 10 and the hole 42 of the block 9. Then, the shaft 41 is moved in the direction of the arrow shown in FIG. 5A, pushing the deuterium cylinder 33 for a prescribed distance, e.g., about 1/4 of the thickness of the disk 15. As a result, the deuterium cylinder 33 is located, partly in the hole 31 and partly in the hole 42—with the tritium cylinder 40 positioned at the middle portion of the hole 31 as illustrated in FIG. 5A. The shaft 41 is pulled from the hole 31 in the direction of the arrow shown in FIG. 5B, whereby a space is formed in the hole 31. This space extends horizontally for a distance which is about ¼ of the thickness of the disc 15.

Under this condition, the pellet carrier disk 15 is moved downwards until the hole 31 goes into axial alignment with the fifth hole 29 of the cooling block 10. The cooling block 9 and the moving disc 15 generate a shearing force, which is exerted on the deuterium mass 33. That portion of the cylinder 33 set in the hole 42 is cut from the remaining portion of the cylinder 33, as is seen from from FIG. 6A.

Figure 6A:
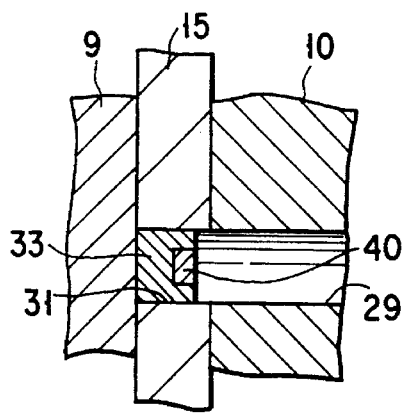
FIGS. 6A and 6B are enlarged sectional views of said section of the apparatus, for explaining how additional deuterium gas is applied and solidified, and respectively showing the unfinished pellet before the application of the additional deuterium gas and the pellet completed after the application of the additional deuterium gas.
Figure 6B:
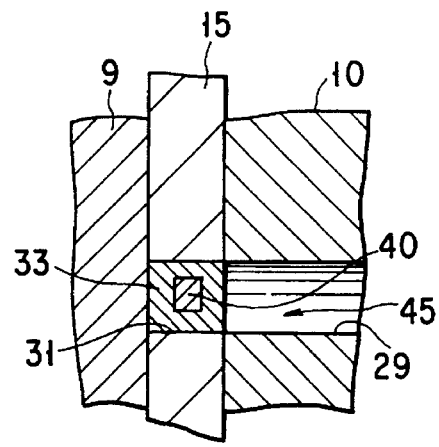

Inserted in the fifth hole 29 of the cooling block 10 is a pipe 43 which is used as third material supplying means for supplying deuterium gas into the hole 31 of the pellet carrier disc 15. In operation, deuterium gas is introduced into the hole 31, while the hole 31 remains aligned with the fourth hole 29 as shown in FIG. 6A. In the hole 31, the deuterium gas solidifies, forming a thin tritium cylinder. The thin tritium cylinder is integral with the cylinder 33 and covers the exposed end of the tritium cylinder 40, as is illustrated in FIG. 6B. As a result of this, there is produced a double-layer pellet 45 which consists of the deuterium cylinder 33 (i.e., the outer layer) and the tritium cylinder 40 (i.e., the core) completely embedded in the deuterium cylinder 33.

As shown in FIG. 1, one end portion of a high-pressure gas pipe 46 is inserted in the sixth hole 30 of the cooling block 10. The other end portion of the pipe 46 extends through one wall of the the main casing 2 and projects outwards therefrom. The cooling block 9 has a through hole 47 which extends horizontally and which is axially aligned with the sixth hole 30 of the cooling block 10. Inserted in this through hole 47 is one end portion of the pellet-ejecting barrel 48. The other end portion of the barrel 48 extends through one wall of the main casing 2 and projects outwards therefrom. The high-pressure gas pipe 46 and the pellet-ejecting barrel 48 communicate with each other as long as the pellet carrier disc 15 is positioned, with its hole 31 axially aligned with the sixth hole 30 of the cooling block 10.

To remove double-layer pellet 45 from the apparatus, the pellet carrier disk 15 is moved until the hole 31 goes into axial alignment with the sixth hole 30 of the cooling block 10. Then, high-pressure gas is supplied onto the pellet 45 through the high-pressure gas pipe 46. The pellet 45 is thereby forced through the pellet-ejecting barrel 48 and finally ejected from the apparatus. The pellet 45 ejected from the apparatus is examined for its shape, its speed and its structure, through an observation window made in a tube connected to the tubular casing 6.

The operation of the apparatus shown in FIG. 1 will be explained below.

Liquid helium (or low temperature helium gas) used as cooling medium is made to flow into the heat exchangers 7 and 8 via the helium inlet pipes 11 and 13. The cryo section, including the cooling blocks 9 and 10 and the pellet carrier disc 15, is thereby cooled to an extremely low temperature (10 K or less).

Next, the pellet carrier disc 15 is set, with the hole 31 axially aligned with the first hole 25 of the cooling block 10 as shown in FIG. 2A. Deuterium gas is introduced into the hole 31 through the pipe 32 and the first hole 25. In the hole 31, the deuterium gas solidifies, forming a deuterium cylinder 33 as shown in FIG. 2B.

Figure 3B:
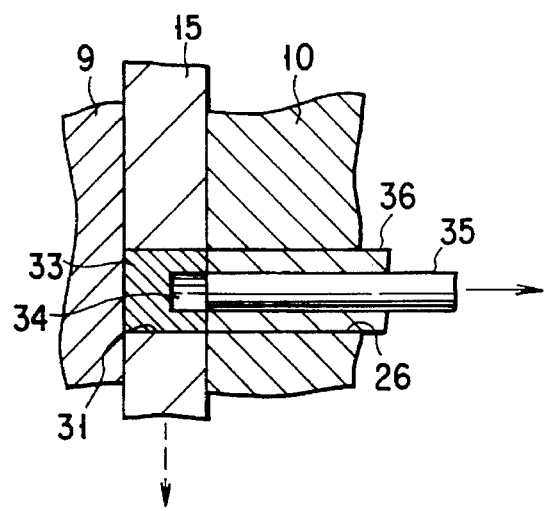
Figure 4:
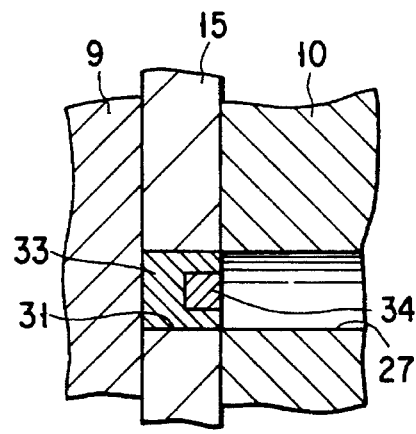
FIG. 4 is an enlarged sectional view showing said section of the apparatus, for explaining how tritium gas is introduced into the hole of the deuterium cylinder.

Thereafter, the pellet carrier disc 15 is moved in the direction of the solid-line arrow (FIG. 2B), bringing the hole 31 into axial alignment with the second hole 26 of the cooling block 10. The shaft 35 is thrust in the direction of the arrow (FIG. 3A) until its distal end portion plunges into the deuterium cylinder 33 as shown in FIG. 3A. Then, as shown in FIG. 3B, the shaft 35 is pulled in the direction of the arrow, forming a hole 34 in the deuterium cylinder 33.

Furthermore, the pellet carrier disc 15 is moved in the direction of the broken-line arrow (FIG. 3B), bringing the hole 31 into axial alignment with the third hole 27. Tritium gas is introduced into the hole 34 of the deuterium cylinder 33 through the pipe 37. The tritium gas solidifies in the hole 34, forming a tritium cylinder 40.

Then, the pellet carrier disc 15 is moved downwards, thereby setting the hole 31 in axial alignment with the fourth hole 28 of the cooling block 10 and also with the hole 42 of the cooling block 9. The shaft 41 is moved in the direction of the arrow as shown in FIG. 5A, pushing the deuterium cylinder 33 until an end portion of the cylinder 33 projects from the hole 31 into the hole 42 of the cooling block 9. As a result, the tritium cylinder 40 is positioned almost at the middle portion of the hole 31 as illustrated in FIG. 5A.

Figure 5B:
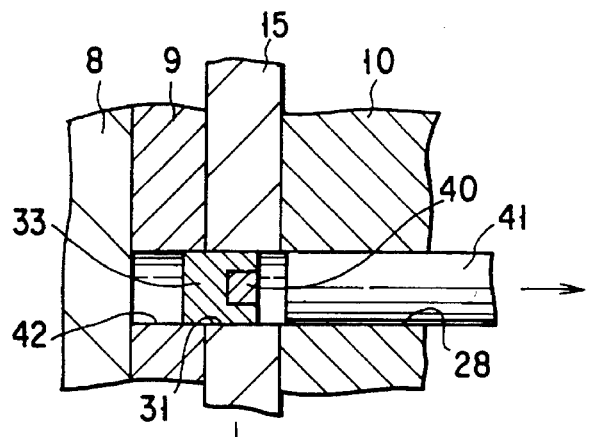

Next, the shaft 41 is moved in the direction of the solid-line arrow shown in FIG. 5B for a prescribed distance, forming a space in the hole 31 and between the cylinder 33 and the distal end of the shaft 41.

Under this condition, the pellet carrier disc 15 is moved in the direction of the broken-line arrow shown in FIG. 5B, until the hole 31 goes into axial alignment with the fifth hole 29 of the cooling block as shown in FIG. 6A. That portion of the deuterium cylinder 33 set in the hole 42 is thereby cut from the remaining portion of the cylinder 33, as is seen from from FIG. 6A. Said portion of the cylinder 33, left in the hole 42 of the cooling block 9, will be heated later, turning into deuterium gas, which will be collected through a passage (not shown) made in the cooling block 9.

Then, deuterium gas is introduced into the space formed in the hole 31, through the pipe 43. The deuterium gas solidifies in this space, forming a thin tritium cylinder. The thin tritium cylinder is integral with the cylinder 33 and covers the exposed end of the tritium cylinder 40, as is illustrated in FIG. 6B. As a result of this, there is produced a double-layer pellet 45 which consists of the deuterium cylinder 33 and the tritium cylinder 40 embedded in the deuterium cylinder 33.

Thereafter, the pellet carrier disc 15 is moved in the direction of the arrow shown in FIG. 6A setting the hole 31 into axial alignment with the sixth hole 30 of the cooling block 10. A high-speed, high-pressure flow valve (not shown), an electromagnetic solenoid (not shown) the like is driven at a proper time, thereby introducing high-pressure gas onto the pellet 45 through the high-pressure gas pipe 46 in the direction of the arrow shown in FIG. 7A. The pellet 45 is thereby forced through the pellet-ejecting barrel 48 in the direction of the arrow shown in FIG. 7B and is finally ejected from the apparatus.

Figure 8:
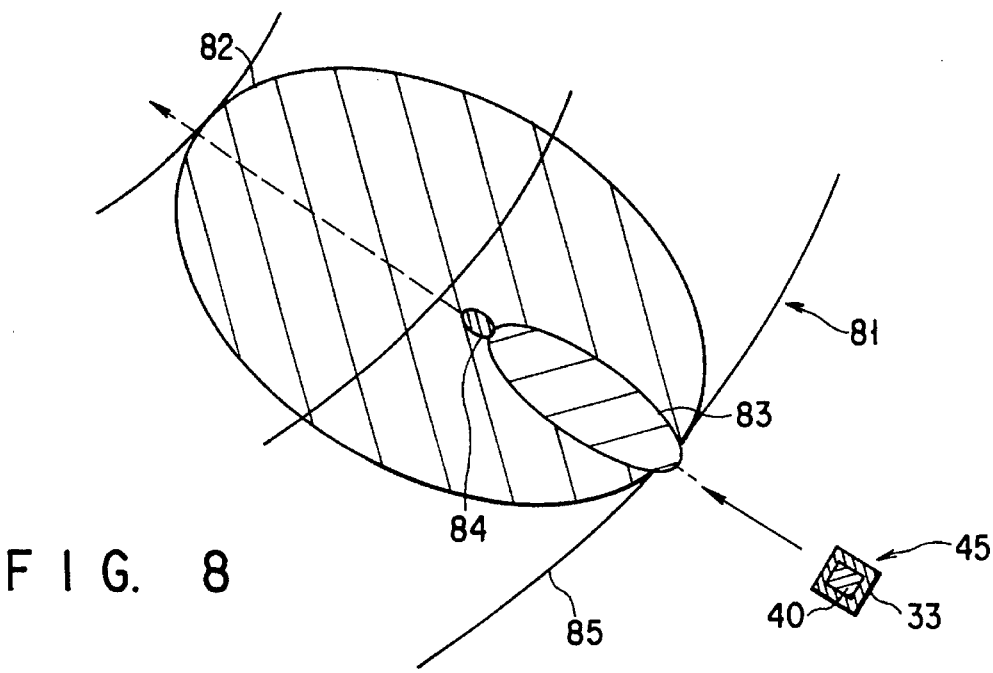
FIG. 8 is a diagram explaining the action which takes place when the double-layer pellet manufactured by the apparatus of FIG. 1 is injected as a fuel into plasma.

As shown in FIG. 8, the pellet 45 is injected into high-temperature plasma 82 generated in a fusion reactor 81 or the like. First, the outer layer of the pellet 45, i.e., the deuterium cylinder 33 evaporates in the plasma 82, and the resultant deuterium gas spreads, forming a gas region 83. Then, the tritium cylinder 40 evaporates near the central part of the plasma, forming vapor cloud 84, as shown in FIG. 8. In this way, fuel is supplied into the plasma 82.

As mentioned above, the the apparatus of FIG. 1 produces a double-layer pellet 45 for use in refueling a D-T type fusion reactor, in the following steps. First, a deuterium cylinder 33 is formed. Next, the shaft 35 is thrust into the cylinder 33, making a hole 34 in one end of the deuterium cylinder 33. Tritium gas is then introduced into the hole 34, forming a tritium cylinder 40 in the hole 34. An end portion of the deuterium cylinder 33 is cut off. Further, deuterium gas is applied onto that end of the deuterium cylinder 33 at which the tritium cylinder 40 is exposed. The deuterium gas solidified, forming a layer completely covering the tritium cylinder 40. Hence, the tritium cylinder 40 is not exposed at all.

The diameter and depth of the hole 34 in the deuterium cylinder 33 can be altered merely by using a shaft having a different diameter and by plunging the shaft into the cylinder 33 for a different distance. In the hole 34, tritium gas can be cooled and solidified without fail. As a result, the size of tritium cylinder 40 (i.e., the core of the pellet 45) can be changed, and the position the cylinder 40 takes with respect to the deuterium cylinder 33 (i.e. the outer layer of the pellet 45) can be altered. In other words, the apparatus can manufacture pellets each comprising an outer later and a core which has a desired size and assumes a desired position with respect to the outer layer.

When the pellet 45 is injected at a proper speed into the plasma generated in a fusion reactor, deuterium, which is not radioactive material and causes no troubles if discharged and recollected, is supplied into the peripheral portion of the plasma. On the other hand, tritium, which is radioactive material, is supplied into only the central part of the plasma, in which nuclear fusion takes place with high efficiency. The load on the tritium-recollecting system and tritium-separating system of the fusion reactor can be reduced remarkably.

Since solidified deuterium is much softer than ordinary substances, it is very easy to make a hole in the deuterium cylinder 33. In addition, since the solidifying point of tritium is higher than that of deuterium, it is very easy to solidify tritium in the hole 34 of the deuterium cylinder 33. Therefore, the pellet 45 having the structure specified above can be manufactured with ease.

The apparatus shown in FIG. 1 can manufacture not only the double-layer pellets 45 designed for use in refueling a D-T type fusion reactor, but also double-layer pellets designed for use in refueling a D-3He fusion reactor, each of which comprises an outer layer made of deuterium and a core of liquid helium. To manufacture this type of a double-layer, it suffices to introduce helium gas (not tritium gas) into the hole 34 of the deuterium cylinder 33 though the pipe 37 and the hole 27 of the cooling block 10. In the hole 34, the helium gas is cooled and liquefied, with taking the direction of the machine set-up into consideration, as described below.

Furthermore, the apparatus shown in FIG. 1 can manufacture a double-layer pellet which comprises an outer layer made of hydrogen and a core made of deuterium. To manufacture this type of a pellet, it suffices to introduce hydrogen gas (not deuterium gas) into the hole 31 of the disc 15 through the first hole 25 of the cooling block 10, thereby forming a hydrogen cylinder, to make a hole 34 in one end of the hydrogen cylinder, and to introduce deuterium gas (not tritium gas) into the hole 34 through the pipe 37 and the hole 27 of the cooling block 10.

In the apparatus of FIG. 1, the pellet carrier disc 15 is moved vertically. Instead, the disc 15 may be positioned horizontally and moved horizontally. In this case, both cooling blocks 9 and 10 are positioned horizontally, too—one contacting the upper surface of the disc 15, and the other contacting the lower surface of the disc 15. A cylinder 33 (i.e., the outer layer of a pellet) of, for example deuterium, is positioned vertically, and a hole 34 is formed in the top of the cylinder and extends vertically. Hence, if liquid helium is filled in the hole 34 to be used as the core, it will not flow out of the hole 34.

When a double-layer pellet of any type described above is injected into plasma generated in a fusion reactor or an experimental fusion apparatus, a small number of specific ions can be supplied to a desired part of the plasma to minimize the loss of heated high-energy ions, as is required to accomplish a successful plasma physical experiment or to perform ion cyclotron range of frequency heating method. The apparatus of the present invention can manufacture double-layer pellets which can be used to control plasma, as well. Another apparatus which is the second embodiment of the present invention will be described, with reference to FIG. 9.

Figure 9:
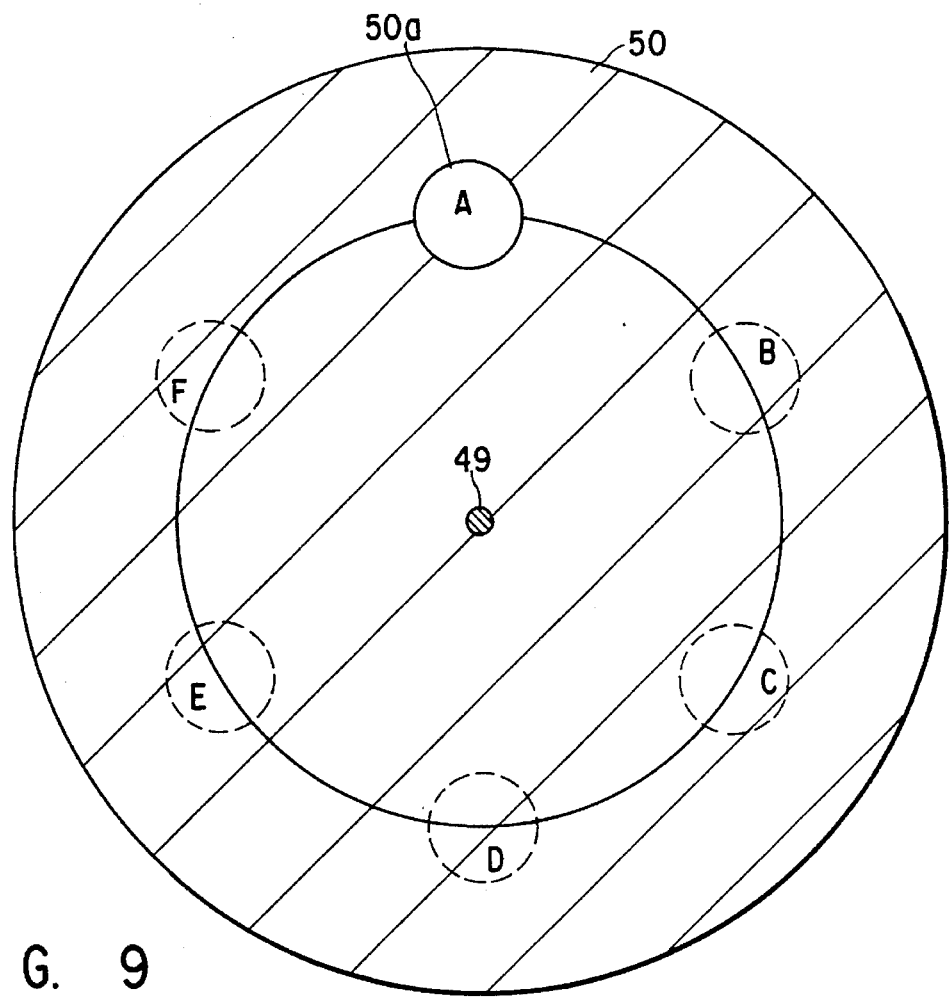
FIG. 9 is a plan view of a pellet carrier incorporated in an apparatus for manufacturing double-layer pellets, which is a second embodiment of the invention.

FIG. 9 shows a pellet carrier disc 50 incorporated in this apparatus. The disc 50 can rotate around a shaft 49 in a gap between two cooling blocks (not shown), while the disc 15 used in the apparatus of FIG. 1 is moved vertically in the gap between the cooling blocks 9 and 10, both made of oxygen-free copper.

The pellet carrier disc 50 has a through hole 50a which corresponds to the hole 31 of the pellet carrier disc 15 used in the apparatus of FIG. 1. The hole 50a can be brought to positions A, B, C, D, E and F as the disc 50 is rotated around the shaft 49. The cooling block (not shown) corresponding to the cooling block 10 has six through holes (not shown) at the positions A, B, C, D, E and F (FIG. 9), respectively. These holes correspond to the first to sixth holes 25 to 30 of the cooling block 10.

In operation, the pellet carrier disc 50 is rotated around the shaft 49, bringing the hole 50a into axial alignment with the six holes of the cooling block which correspond to the holes 25 to 30, so that a double-layer pellet may be produced in the same way as in the apparatus illustrated in FIG. 1.

The apparatus according to the second embodiment of the invention achieves the same advantages as the first embodiment (FIG. 1). In addition, it is advantageous in that, after each pellet has been produced, the hole 50a can be axially aligned with the hole at the position A faster than the hole 31 of the disc 15 is axially aligned with the first hole 25 of the cooling block 10. The second embodiment efficiently operates, particularly the sequence of steps is repeated many times on end to manufacture a number of double-layer pellets.

The disc 50 is rotated around a vertical axis. Instead, it may be rotated around a horizontal axis. If this is the case, the first to sixth holes have a horizontal axis each and are arranged in a circle concentric to the horizontal axis, spaced apart from one another by a predetermined distance.

An apparatus according to a third embodiment of the invention will be described with reference to FIGS. 10 to 17.

This apparatus is designed to manufacture a double-layer pellet whose core is a tiny chip of, for example, lithium and whose outer layer is made of deuterium. The components of the apparatus, which are similar or identical to those of the first embodiment, are designated at the same numerals in FIGS. 10 to 18 as in FIGS. 1 to 9, and will not be described in detail in the following description.

Figure 10:
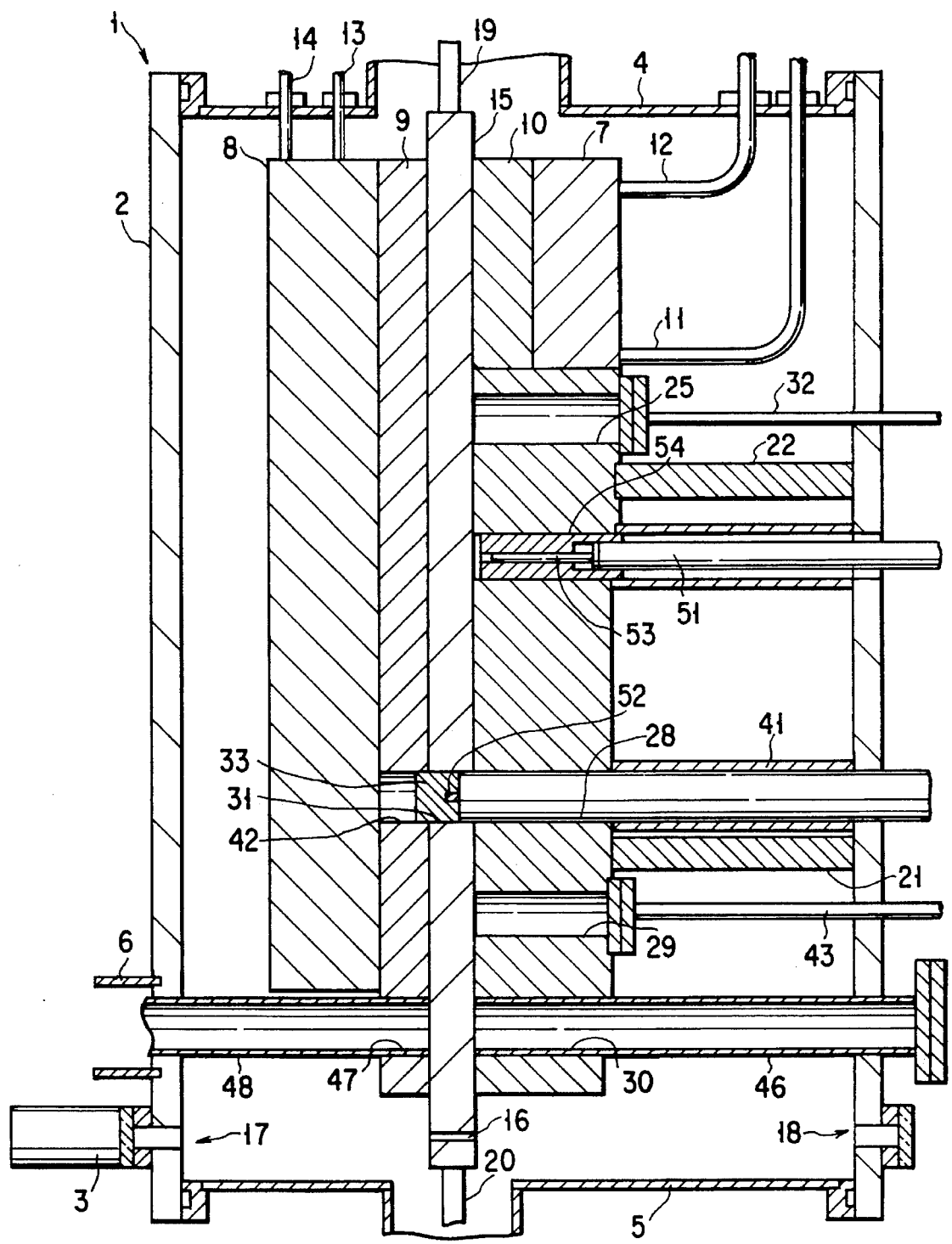
FIG. 10 is a sectional view showing another apparatus for manufacturing double-layer pellets, which is a third embodiment of the present invention.

As can be understood from FIG. 10 which is a sectional view, the third embodiment is characterized in that the cooling block 10 made of oxygen-free copper has a hole 51 instead of the holes 26 and 27 for introducing deuterium gas and tritium gas, respectively. This hole 51 is used to insert a tiny chip 52 (e.g., a lithium chip) into a deuterium cylinder 33 formed in the hole 31 of the pellet carrier disc 15. (In the first and second embodiments, a tritium cylinder 40 is formed in a hole made in the deuterium cylinder 33.)

Slidably provided in the hole 51 is a shaft 53 which is used to insert the tiny chip. To state more precisely, the shaft 53 is supported in a tubular shaft guide 54 which is fitted in the hole 51, and can be moved back and forth through the shaft guide 54.

Figure 11:
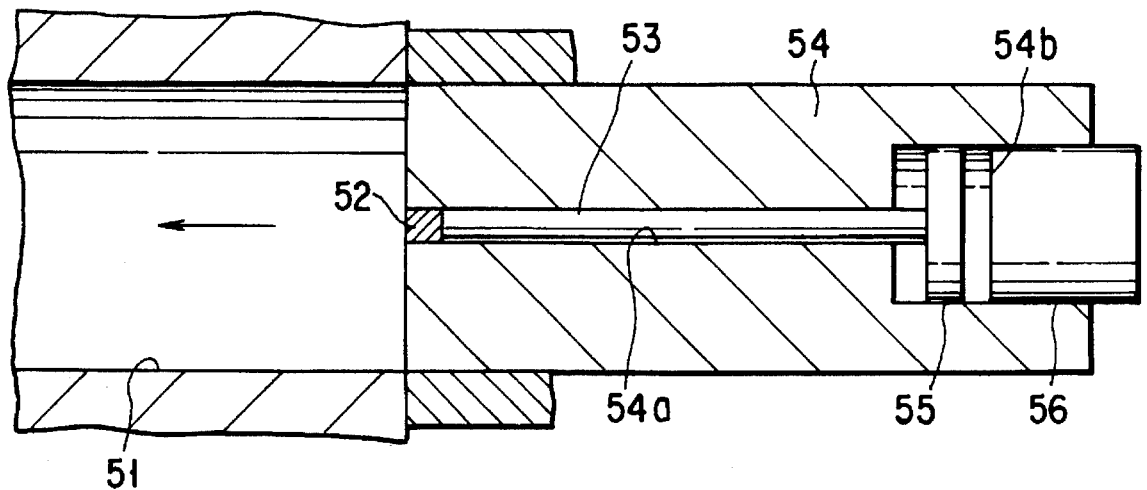
FIG. 11 is an enlarged sectional view of that section of the apparatus shown in FIG. 10, which includes a shaft for inserting a chip into a deuterium cylinder.

The shaft 53 is a slender rod having a diameter of, for example, 50 to 100 μm. As shown in FIG. 11, the shaft 53 is slidably inserted in a small hole 54a made in the distal portion of the shaft guide 54. The shaft 53 is connected, at its rear end, to a disc 55 which has a larger diameter than that of the shaft 53. The disc 55 is slidably inserted in a large hole 54b made in the proximal portion of the shaft guide 54. The large hole 54b has a diameter larger than that of the shaft 53 and is contiguous with the small hole 54a. Slidably inserted in the large hole 54b of the shaft guide 54 is a disc-pushing rod 56, which can be moved horizontally to push the disc 55, thereby to move the shaft guide 34 forwards.

The shaft 53, the shaft guide 54, the disc 55 and the disc-pushing rod 56 constitute means for inserting the tiny chip 52 into the deuterium cylinder 33.

Figure 12:
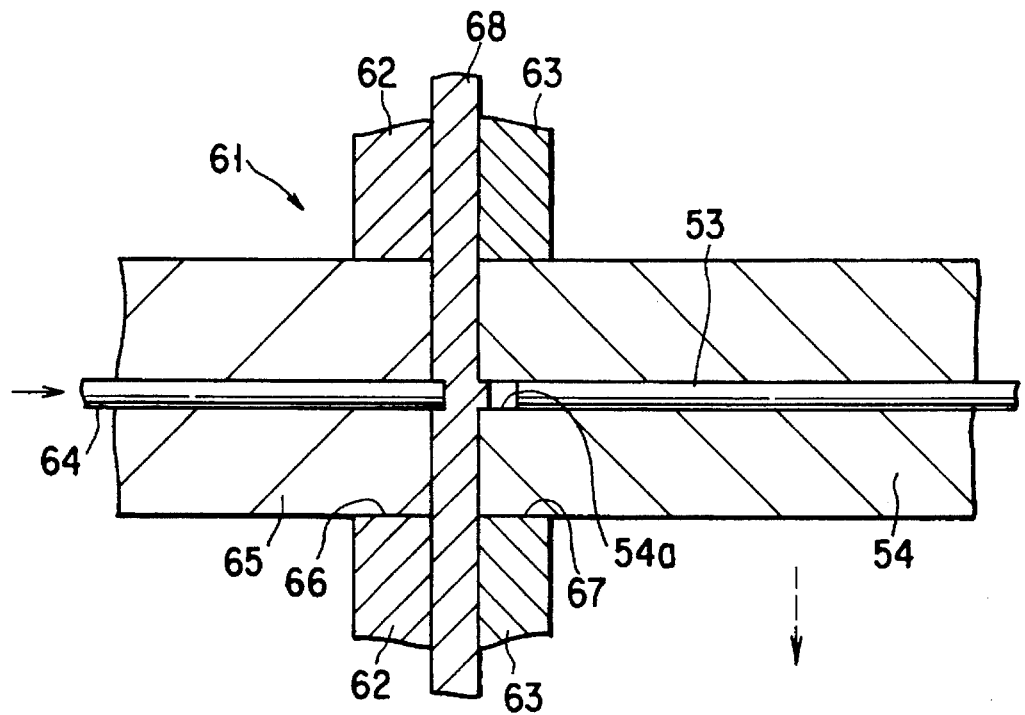
FIG. 12 is an enlarged sectional view of another section of the apparatus (FIG. 10), for explaining how to attach a chip to the distal end of the shaft.

The tiny chip 52, to be inserted into the deuterium cylinder 33, is made of, for example, lithium which has the least atomic number of all metals which are solid at normal temperature and which is a very soft metal. The chip 52 is supplied into the distal end of the small hole 54a of the shaft guide 54, by means of a chip-supplying device 61. As shown in FIG. 12, the device 61 comprises foil-holding plates 62 and 63, a pushing shaft 64, and a shaft guide 65.

The plates 62 and 63 clamp a lithium foil 68 which is, for example, 50 to 100 μm thick. The foil-holding plate 62 has a through hole 66. The shaft guide 65 is removably inserted, at the distal end, in the hole 66 of the plate 62, and extends horizontally. The shaft guide 65 has an axial hole, in which the pushing shaft 64 is slidably inserted. The foil-holding plate 63 has a through hole 67 which is axially aligned with the hole 66 of the foil-holding plate 62. The shaft guide 54 is removably inserted, at the distal end, in the hole 67 of the plate 63, and extends horizontally.

As shown in FIG. 12, the pushing shaft 64 is moved in the direction of the arrow until it pushes a portion of the lithium foil 68, a lithium chip 52, into the distal end of the small hole 54a of the shaft guide 54. Then, the shaft 64 is pulled away from the lithium foil 68, leaving the lithium chip 52 in the distal end of the small hole 54a.

Thereafter, the shaft guide 54 and the shaft 53 are pulled from the hole 67 of the foil-holding plate 63, and then inserted into the hole 51 of the cooling block 10.

The lithium chip 52 may be replaced by a chip of a hard material. In this case, the foil-holding plates 62 and 63 clamp not the lithium foil 68, but a plate which has many holes filled with chips of that hard material, and the pushing shaft 64 is thrust in the direction of the arrow shown in FIG. 12 to attach the chip to the distal end of the shaft 53.

Figure 13A:
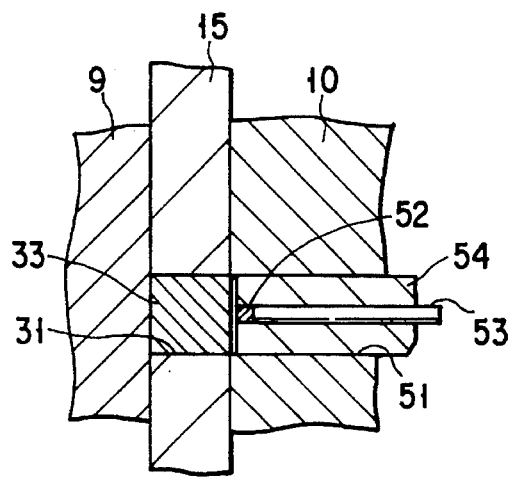
FIGS. 13A, 13B and 13C are enlarged sectional views of said section of the apparatus (FIG. 10), for explaining how to insert a chip into a deuterium cylinder, respectively showing the chip not inserted yet into the cylinder, the chip being inserted into the cylinder and the chip completely inserted in the cylinder.
Figure 14A:
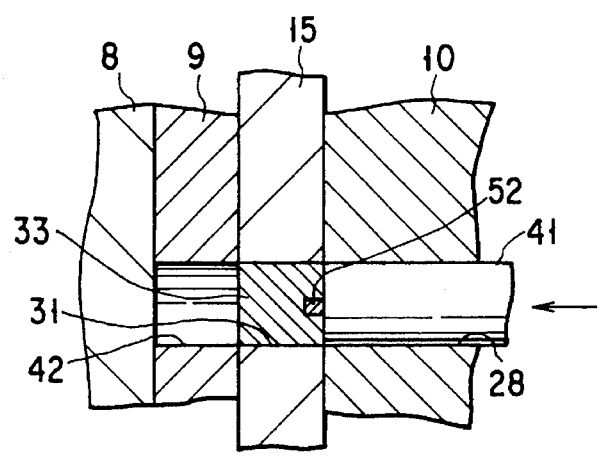
FIGS. 14A, 14B and 14C are enlarged sectional views of said section of the apparatus (FIG. 10), for explaining how to position the chip in the middle portion of the hole 31 of the cooling block, respectively showing the chip not so positioned yet, the chip being so positioned and the chip completely so positioned.

The chip 52 is moved through the hole 51 of the cooling block 10 to be inserted into the deuterium cylinder 33. More specifically, the pellet carrier disc 15 is moved until its through hole 31 is set into axial alignment with the hole 51 of the cooling block 10 as shown in FIG. 13A. Then, the shaft 53 is moved in the direction of the arrow shown in FIG. 13B, for a distance equal to the length of the chip 52. The chip 52 is thereby inserted into the deuterium cylinder 33. The shaft 53 is moved away from the cylinder 33, in the direction of the arrow shown in FIG. 13C, leaving the chip 52 in the deuterium cylinder 33.

The same manufacturing steps are performed as in the first embodiment (FIG. 1), until the deuterium cylinder 33 is formed in the hole 31 of the pellet carrier disc 15.

Thereafter, the chip 52 is attached to the distal end of the shaft 53. To be more specific, as shown in FIG. 12, the lithium foil 68 is clamped between the foil-holding plates 62 and 63, and the shaft guide 54 is inserted into the hole 67 of the foil-holding plate 63. Further, the pushing shaft 64 is thrust in the direction of the arrow, whereby the chip 52 is attached to the distal end of the shaft 53.

After the chip 52 has been attached to the shaft 53, the guide 54 is pulled from the shaft foil-holding plate 63 and inserted into the hole 51 of the cooling block 10.

The pellet carrier disc 15 is moved until its hole 31 is set into axial alignment with the hole 51 of the cooling block 10 as illustrated in FIG. 13A.

Figure 13B:
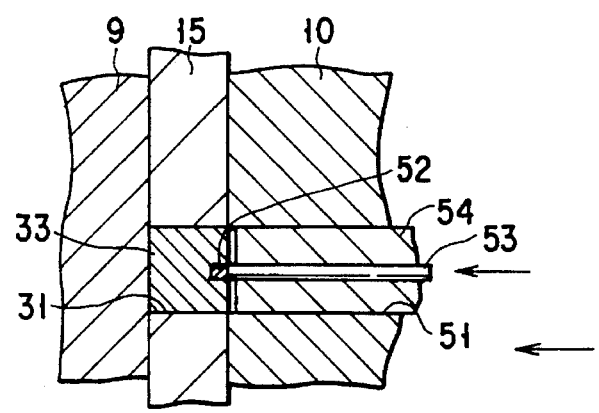

Next, the shaft 53 is moved in the direction of the arrow shown in FIG. 13B, thereby inserting the chip 52 into the deuterium cylinder 33. The shaft 53 is then pulled from the deuterium cylinder 33, in the direction of the arrow shown in FIG. 13C. As a result, the chip 52 is left embedded in one end of the deuterium cylinder 33.

Figure 14B:
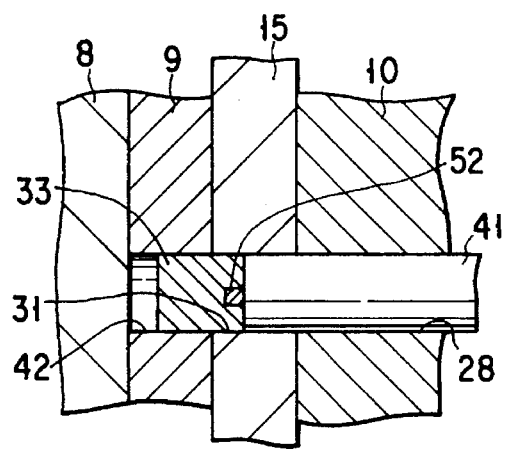
Figure 13C:
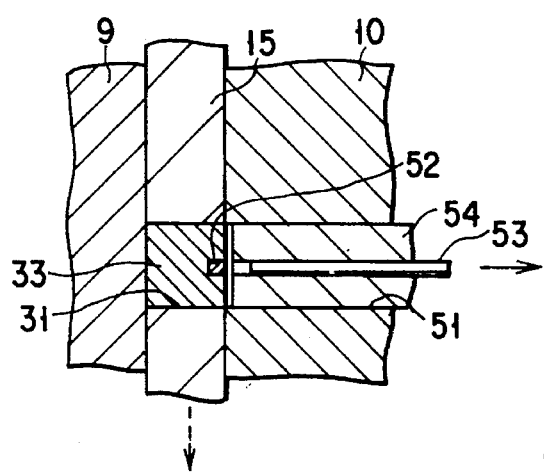
Figure 14C:
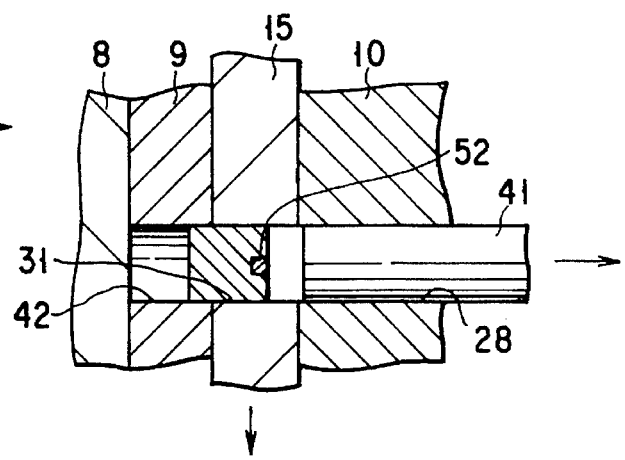

Thereafter, the same step is performed in the hole 28 of the cooling block 10, as is performed in the first embodiment and as shown in FIGS. 5A and 5B. In other words, a shaft 41 is moved through the hole 28 in the direction of the arrow shown in FIG. 14A, for a distance, e.g., about half the length of the hole 31, thereby pushing the deuterium cylinder 33 (now containing the chip 52) as shown in FIG. 14B. Then, the shaft 41 is pulled from the hole 31, in the direction of the arrow shown in FIG. 14C. The deuterium cylinder 33 is thereby located with the chip 52 positioned almost at the middle portion of the hole 31 of the pellet carrier disc 15.

Figure 15A:
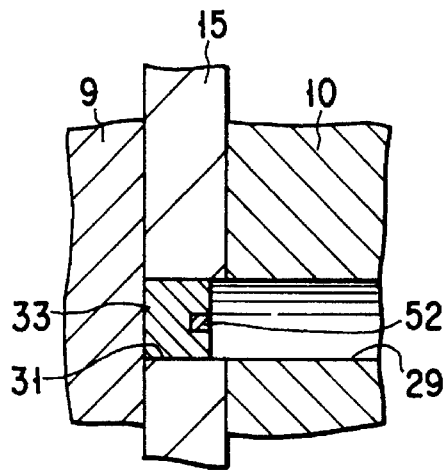
FIGS. 15A and 15B are enlarged sectional views of said section of the apparatus (FIG. 10), for explaining how to apply deuterium gas, respectively showing the condition before the gas is introduced and the condition after the gas has been introduced.
Figure 15B:
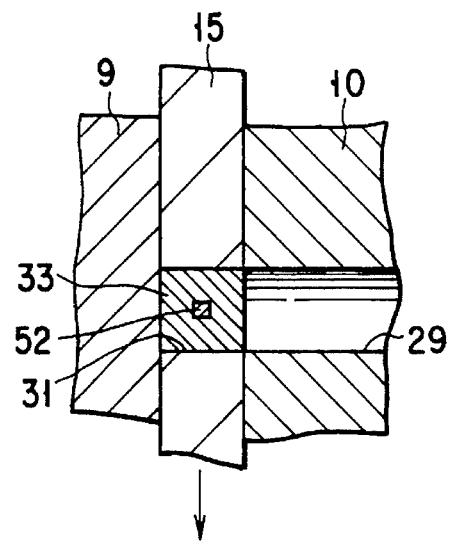
Figure 16A:
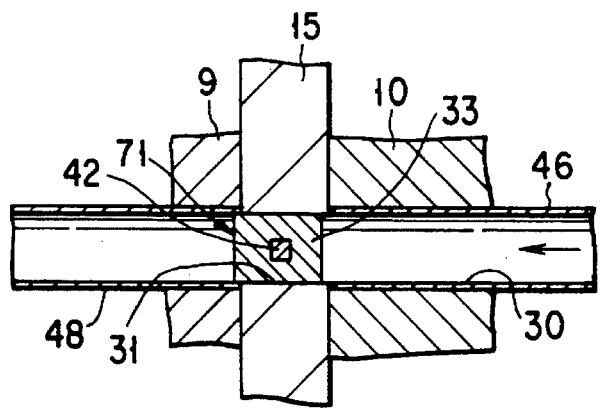
FIGS. 16A and 16B are enlarged sectional views of said section of the apparatus (FIG. 10), for explaining how to remove a pellet from the apparatus, respectively showing the pellet to be removed and the pellet being removed.
Figure 16B:
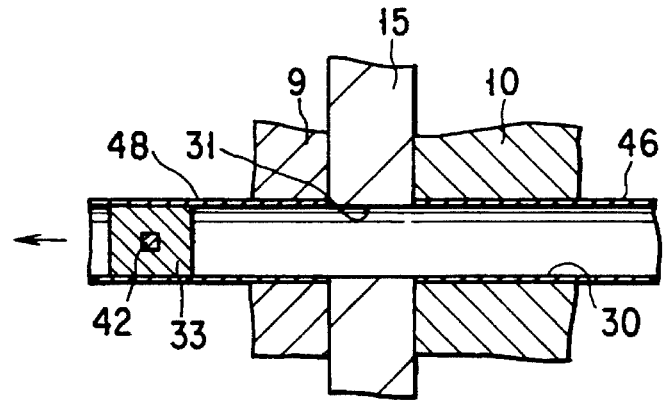

Then, the same step is performed as is conducted in the first embodiment and as shown in FIGS. 6A and 6B. More precisely, that portion of the deuterium cylinder 33 which protrudes into the hole 42 of the cooling block 9 is cut off as illustrated in FIG. 15A, and deuterium gas is introduced into the hole 31, forming a deuterium layer on the end of the cylinder 33, covering the chip 52. As a result, there is produced a double-layer pellet 71 which consists of the deuterium cylinder 33 and the lithium chip 52 completely embedded in the deuterium cylinder 33.

Figure 7A:
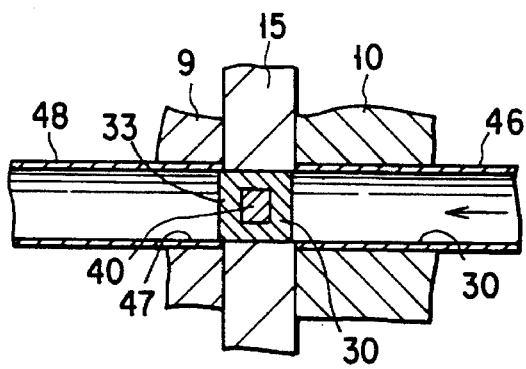
FIGS. 7A and 7B are enlarged sectional views of said section of the apparatus, for explaining how the finished double-layer pellet is removed from the apparatus, and respectively showing the pellet still within the apparatus and the pellet being removed therefrom.
Figure 7B:
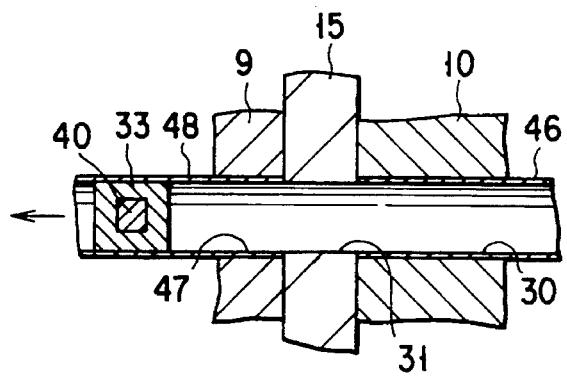

Next, the same step is performed as is carried out in the first embodiment and as shown in FIGS. 7A and 7B. That is, the pellet carrier disc 15 is moved, setting the hole 31 of the disc 15 into axial alignment with the hole 30 of the cooling block 10. High-pressure gas is applied onto the pellet 71 through a high-pressure gas pipe 46 in the direction of the arrow shown in FIG. 16A. The pellet 71 is thereby forced through a pellet-ejecting barrel 48 in the direction of the arrow shown in FIG. 16B and is finally ejected from the apparatus.

Figure 17:
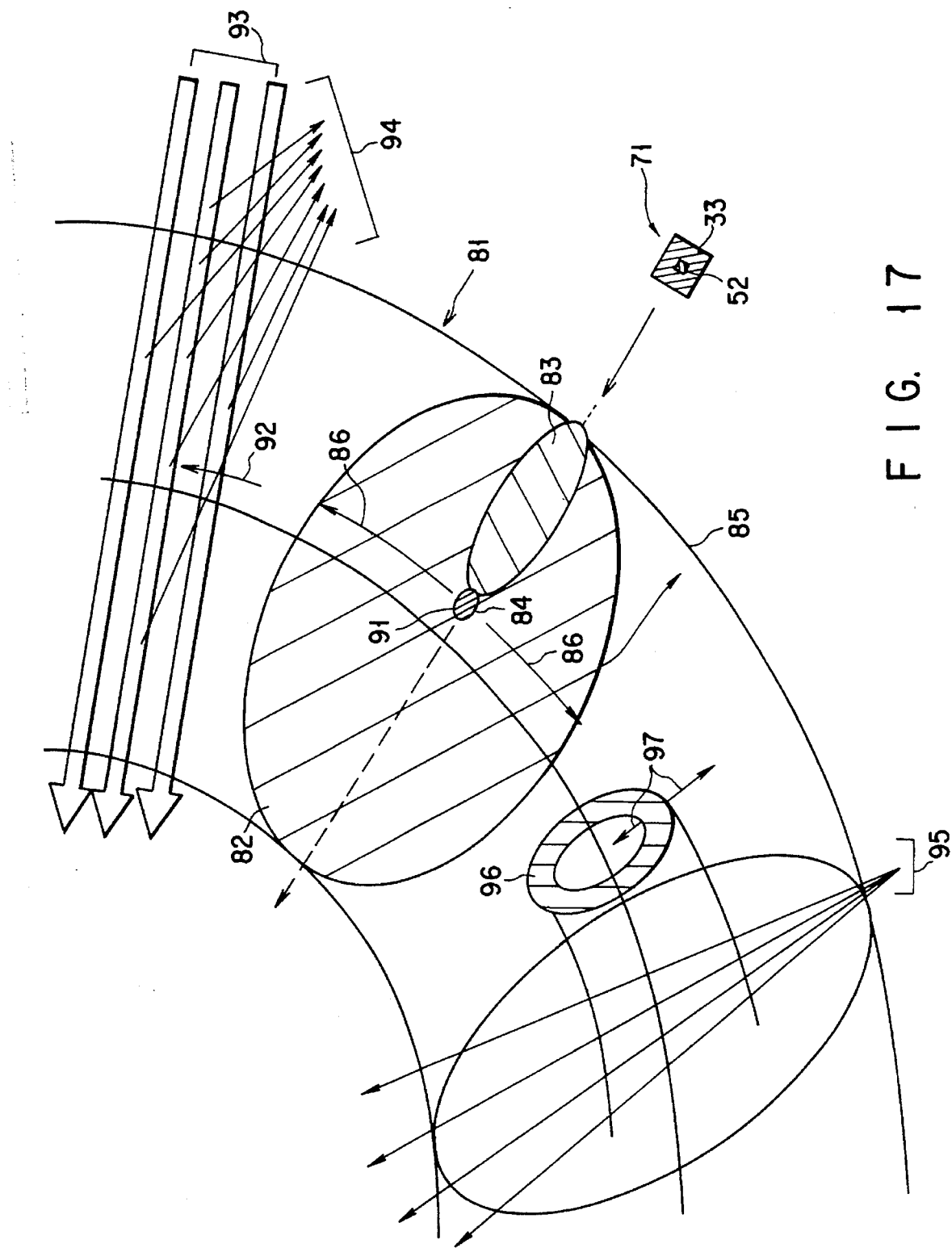
FIGS. 17 is a diagram explaining how the transport of plasma particles is analyzed by using the double-layer pellet manufactured by the apparatus of FIG. 10.

The double-layer pellet 71 thus manufactured may be used in analyzing transport of plasma particles. As shown in FIG. 17, the pellet 71 is injected into high-temperature plasma 82 generated in a fusion reactor 81 or the like. In the peripheral part of the plasma 82, only the deuterium cylinder 33 (i.e., the outer layer of the pellet 71) evaporates, and the resultant deuterium gas spreads, forming a gas region 83, as has been explained with reference to FIG. 8. When the deuterium cylinder 33 evaporates in its entirety, the chip 52 (i.e., the core of the pellet 71) evaporates near the central part of the plasma 82, forming vapor cloud 91.

Some time later, the vapor could 91 is ionized. In initial stage, specific particles move around a torus 85 (only a part shown) along magnetic field lines, in the directions of the arrows 86 (that is, substantially in toroidal direction).

The flux of these specific particles is charge-exchanged with a plurality of neutron beams 93 under examination. A charge-exchanged recombinant light, bremsstrahlung radiation or soft X rays is observed thorough a plurality of channels. The particles being transported in parallel to the lines of magnetic force can thereby be analyzed. As time passes, the specific particles are filled in an annular magnetic surface (or a group of magnetic surfaces) 96. The particles start moving in the direction perpendicular to the magnetic field lines; they diffuse in the direction of the arrow 97. This behavior of the specific particles is observed by the same method as described above, thereby analyzing the plasma particles being transported in a direction perpendicular to the magnetic field lines.

If the chip 52 has an appropriate size, it will be possible to supply specific particles which differ from the particles constituting plasma confined in a space as small as in the range of 1 cm$^3$. Of the specific particles, some move in parallel to the plasma-confining magnetic field lines, and the others move at right angles to the lines of magnetic force. The motion of these specific particles are observed to efficiently analyze the transport of the particles.

In the apparatus (FIG. 10) according to the third embodiment, a deuterium cylinder 33 is first formed to serve as the outer layer of a pellet for use in analyzing the transport of plasma particles. Next, a chip 52 is embedded into one end of the deuterium cylinder 33 by using the shaft 53. Then, the other end of the deuterium cylinder 33 is cut off. Finally, deuterium gas is applied onto the first-mentioned end of the cylinder 33 and cooled and solidified, forming a double-layer pellet 71. The core of the pellet 71, i.e., chip 52, is completely embedded in the outer layer, i.e., the deuterium cylinder; it is not exposed at all. Since the chip 52 is inserted directly into the deuterium cylinder 33, its size can be freely changed. Therefore, the cores and the outer layer can have desired sizes and can take a predetermined positional relationship.

Since solidified deuterium is much softer than ordinary substances, it is very easy to insert the chip 52 into the deuterium cylinder 33. It follows that the double-layer pellet 71 can be easily manufactured.

Like the pellet 45 described above, the double-layer pellet 71 can be used not only in refueling a fusion reactor, but also in supplying specific ions, in no excess numbers, to accomplish a successful plasma physical experiment or to perform ion cyclotron range of frequency heating method.

Specific particles, which differ from the particles constituting plasma, can be supplied to a limited part of the plasma by injecting the double-layer pellet 71 into the plasma. The absolute number of particles supplied into the plasma can therefore be determined with very high accuracy. The specific particles supplied move in parallel to lines of magnetic force (=magnetic field lines), and are observed to analyze the plasma particles being transported in parallel to the lines of magnetic force.

The specific particles starts moving in an annular magnetic surface (or a group of magnetic surfaces), at right angles to the lines of magnetic force. This behavior of the specific particles is observed and examined, thereby to analyze the plasma particles being transported in a direction perpendicular to the lines of magnetic force. Furthermore, the speed with which the pellet 71 is injected into the plasma can be changed in order to change the position in the plasma to which the specific particles are to be applied. In this sense, the use of the pellet 71 helps enhance the flexibility of the particle transport analysis.

An apparatus according to a fourth embodiment of the invention will be described with reference to FIG. 18 which shows the pellet carrier disc 73 incorporated in this apparatus.

Figure 18:
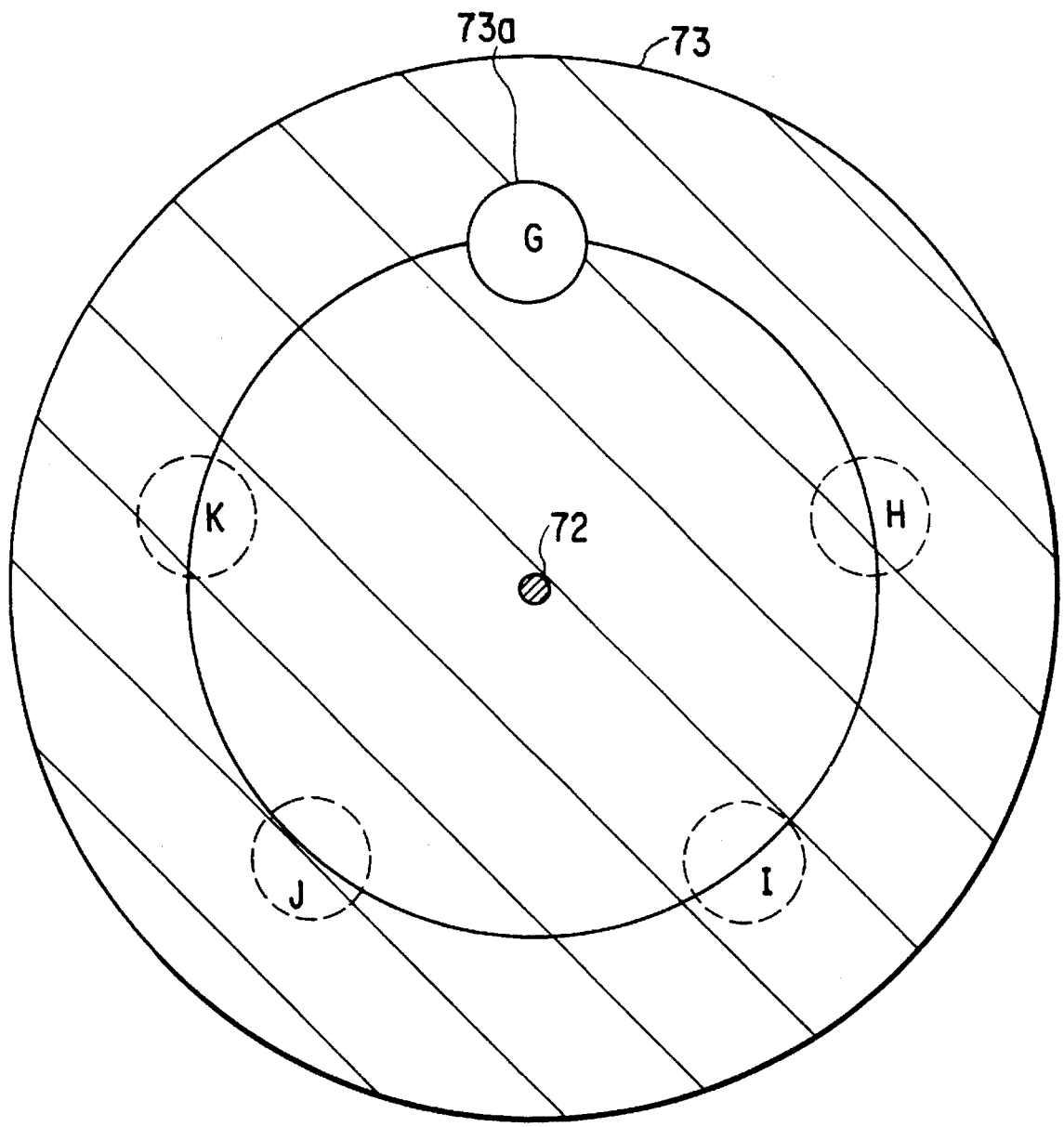
FIG. 18 is a plan view of a pellet carrier incorporated in an apparatus for manufacturing double-layer pellets, which is a fourth embodiment of the invention.

As can be understood from FIG. 18, the apparatus is characterized in that the disc 73 is rotated around a shaft 72, not moved vertically in the gap between the cooling blocks (not shown) as in the third embodiment shown in FIG. 10. The pellet carrier disc 73 has a through hole 73a which corresponds to the hole 31 of the pellet carrier disc 15 used in the apparatus of FIG. 1. The hole 73a can be brought to positions G, H, I, J and K as the disc 72 is rotated around the shaft 72. The cooling block (not shown) corresponding to the cooling block 10 has five through holes (not shown) at the positions G, H, I, J, and K, respectively. These holes correspond to the first to the holes 25, 51, 28, 29 and 30 of the cooling block 10.

In operation the disc 73 is rotated to set the hole 73a into axial alignment with the five holes of the cooling block, one after another. In the five holes of the cooling block, there are performed the manufacturing steps identical to those carried out in the holes 25, 51, 28, 29 and 30 of the cooling block 10. Therefore, the apparatus according to the fourth embodiment of the invention achieves the same advantages as the third embodiment (FIG. 10). It is advantageous also in that, after each pellet has been produced, the hole 73a can be axially aligned with the hole at the position G faster than the hole 31 of the disc 15 is axially aligned with the first hole 25 of the cooling block 10. The fourth embodiment efficiently operates, particularly the sequence of steps is repeated many times on end to manufacture a number of double-layer pellets.

As has been described above in detail, the present invention can provide a method and apparatus which can easily manufacture double-layer pellets whose cores and outer layers can be controlled in their size and their positional relationship, whose cores can be formed without fail, and which can therefore serve to supply fuel into a desired part of plasma in no excess amount.

The present invention can also provide a method and apparatus which can easily manufacture double-layer pellets whose cores are made of chips and whose cores and outer layers can be controlled in their sizes and their positional relationship, which serve to analyze transport of particles and heat in a fusion reactor and, hence, to inject particles to be observed, in no excess numbers, into a desired part of plasma.

Still further, the present invention can provide a method and apparatus which can easily manufacture double-layer pellets which serve to efficiently perform ion cyclotron range of frequency heating.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of manufacturing a double-layer pellet, comprising:

a first step of supplying a first material for forming an outer layer, into a space provided in a pellet carrier body;

a second step of cooling and solidifying the first material in said space, thereby forming a block of the first material; a third step of forming a hole in a first end of the block;

a fourth step of supplying a second material for forming a core, into the hole formed in the first end of the block;

a fifth step of cooling and solidifying the second material in said hole, thereby forming a core;

a sixth step of scraping a second end of said block, which is opposite to the first end; and a seventh step of supplying an additional amount of the first material onto the first end of said block, cooling and solidifying the additional amount of the first material, thereby forming a layer covering the core of the second material.

2. The method according to claim 1, wherein said second material is tritium or helium when said first material is deuterium, said second material is deuterium when said first material is hydrogen, and said second material is deuterium when said first material is a helium chip.

3. The method according to claim 1, wherein said fourth step is performed after said third step.

4. The method according to claim 1, wherein said third and fourth steps are performed simultaneously.

5. A method of manufacturing a double-layer pellet, comprising:

a first step of supplying a first material for forming an outer layer, into a space provided in a pellet carrier body;

a second step of cooling and solidifying the first material in said space, thereby forming a block of the first material;

a third step of inserting a chip into a first end of the block;

a fourth step of scraping a second end of said block, which is opposite to the first end; and a fifth step of supplying an additional amount of the first material onto the first end of said block, cooling and solidifying the additional amount of the first material, thereby forming a layer covering the chip.

6. The method according to claim 1, wherein said first material includes deuterium and said second material includes lithium.

* * * * *